(12) United States Patent
Chung et al.

(10) Patent No.: US 10,838,243 B2
(45) Date of Patent: Nov. 17, 2020

(54) DISPLAY DEVICE

(71) Applicant: Samsung Display Co., Ltd., Yongin-si (KR)

(72) Inventors: Yun-mo Chung, Yongin-si (KR); Ilhun Seo, Asan-si (KR); Hojin Yoon, Hwaseong-si (KR); Daewoo Lee, Hwaseong-si (KR); Minseong Yi, Hwaseong-si (KR); Miyeon Cho, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 327 days.

(21) Appl. No.: 15/682,472

(22) Filed: Aug. 21, 2017

(65) Prior Publication Data
US 2018/0074361 A1 Mar. 15, 2018

(30) Foreign Application Priority Data

Sep. 13, 2016 (KR) ........................ 10-2016-0117895

(51) Int. Cl.
  G02F 1/1333  (2006.01)
  G02F 1/1345  (2006.01)
  F21V 33/00   (2006.01)
  H05K 5/02    (2006.01)

(52) U.S. Cl.
  CPC .... G02F 1/133308 (2013.01); F21V 33/0052 (2013.01); G02F 1/13452 (2013.01); G02F 1/133305 (2013.01); H05K 5/02 (2013.01); G02F 1/13336 (2013.01); G02F 2001/13332 (2013.01)

(58) Field of Classification Search
CPC combination set(s) only.
See application file for complete search history.

(56) References Cited

U.S. PATENT DOCUMENTS

| | | | |
|---|---|---|---|
| 8,827,536 B2 | 9/2014 | Lee et al. | |
| 9,110,320 B2 | 8/2015 | Chen et al. | |
| 9,326,375 B2 | 4/2016 | Lee | |
| 9,419,065 B2 | 8/2016 | Degner et al. | |
| 2015/0173212 A1 | 6/2015 | Lee et al. | |
| 2016/0179229 A1* | 6/2016 | Ahn | G06F 3/041 |
| | | | 345/173 |

FOREIGN PATENT DOCUMENTS

| | | |
|---|---|---|
| JP | 5589683 | 9/2014 |
| KR | 10-1212172 | 12/2012 |
| KR | 10-2015-0071415 | 6/2015 |

* cited by examiner

*Primary Examiner* — Ratisha Mehta
(74) *Attorney, Agent, or Firm* — H.C. Park & Associates, PLC

(57) ABSTRACT

A display device includes a display panel and at least one electronic component connected to the display panel. The display panel includes a display area and a non-display area disposed around the display area on a plane. The non-display area has a first bending line and a second bending line intersecting the first bending line. The display panel includes a circuit layer and a display element layer including display elements. The circuit layer is disposed in the display area, disposed on a different layer than pixel circuits, and electrically connects the at least electronic component and the driving circuit.

20 Claims, 15 Drawing Sheets

FIG. 1
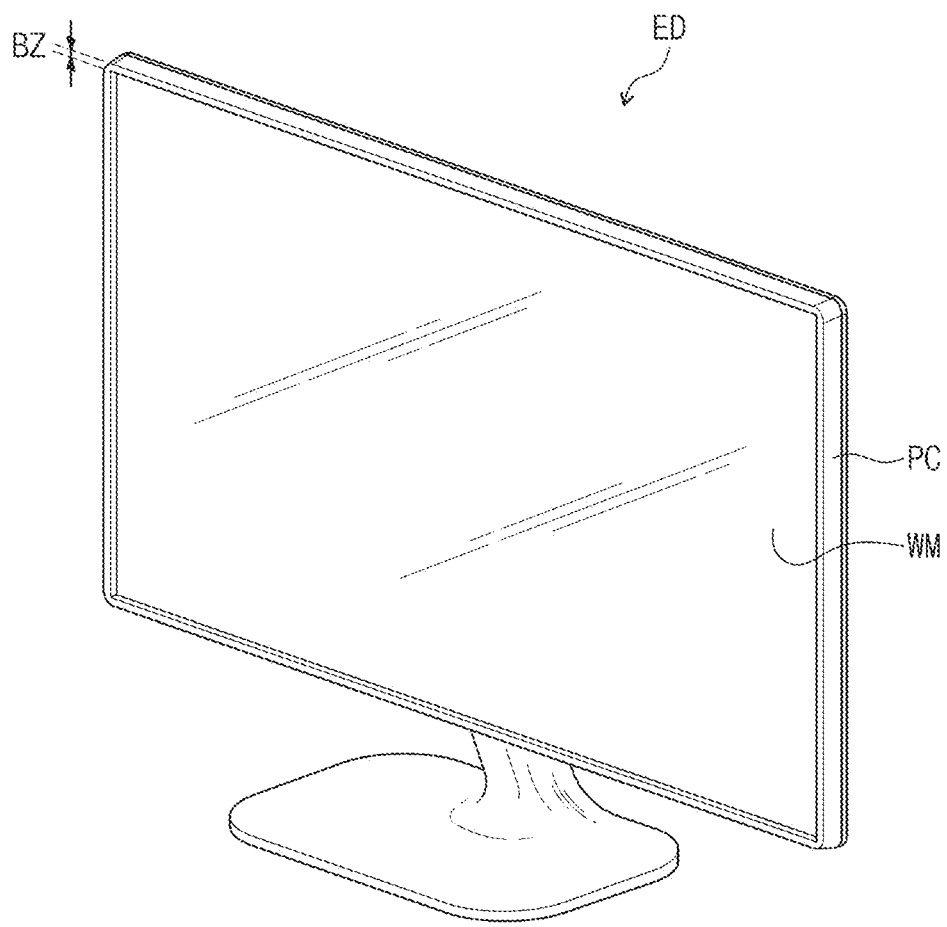
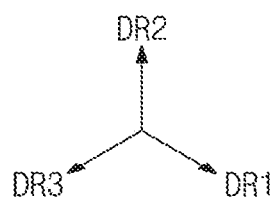

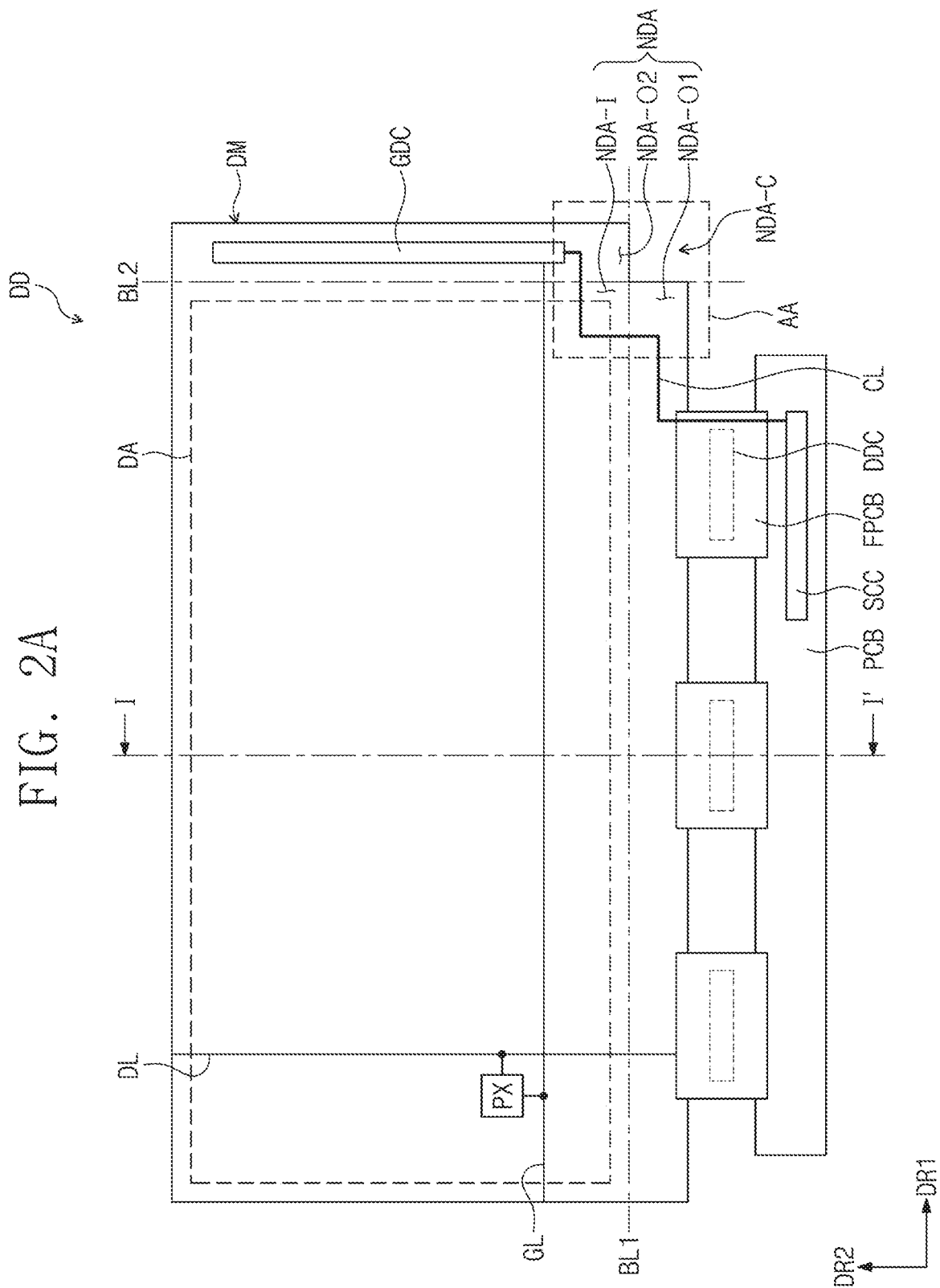

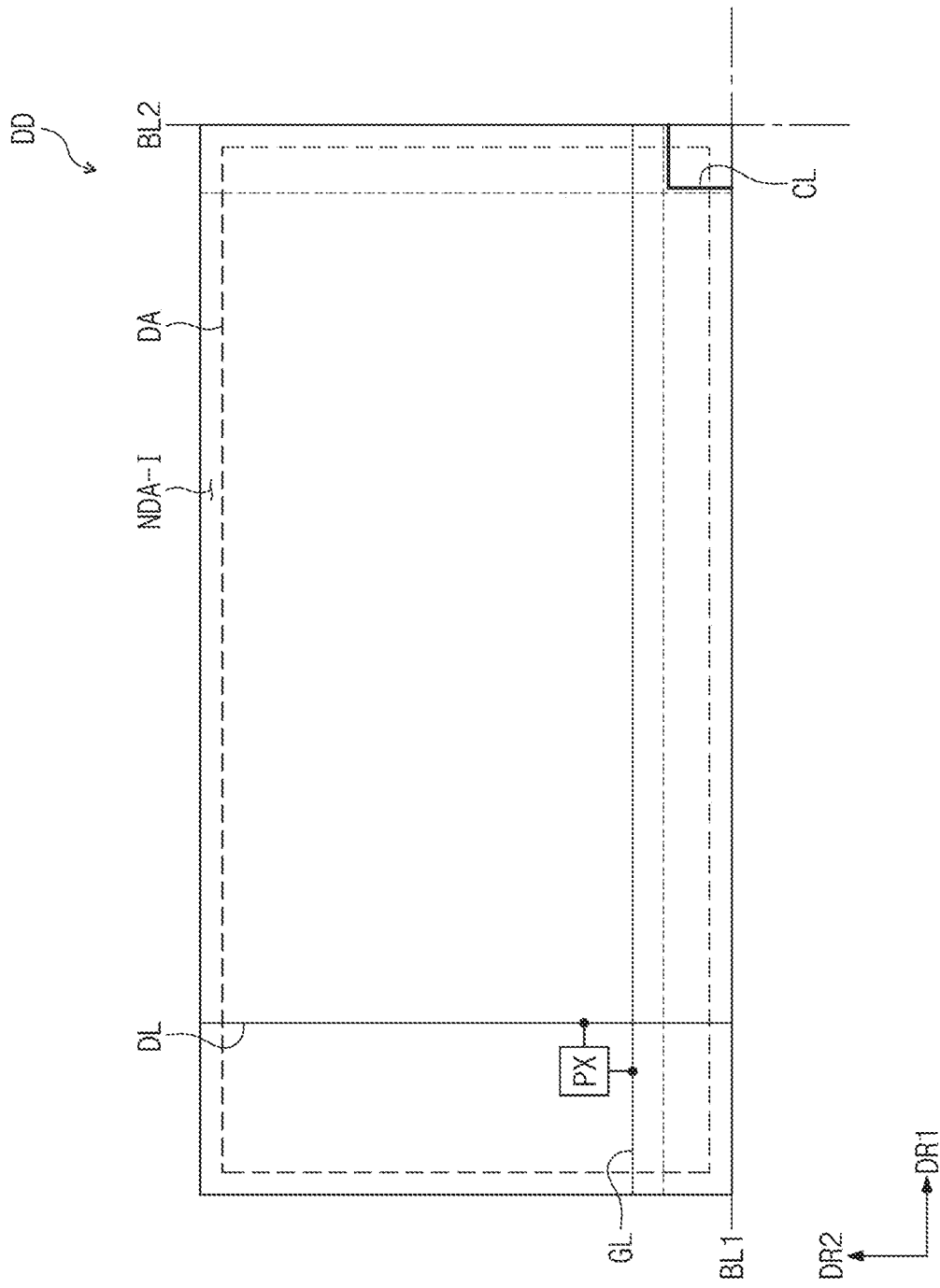

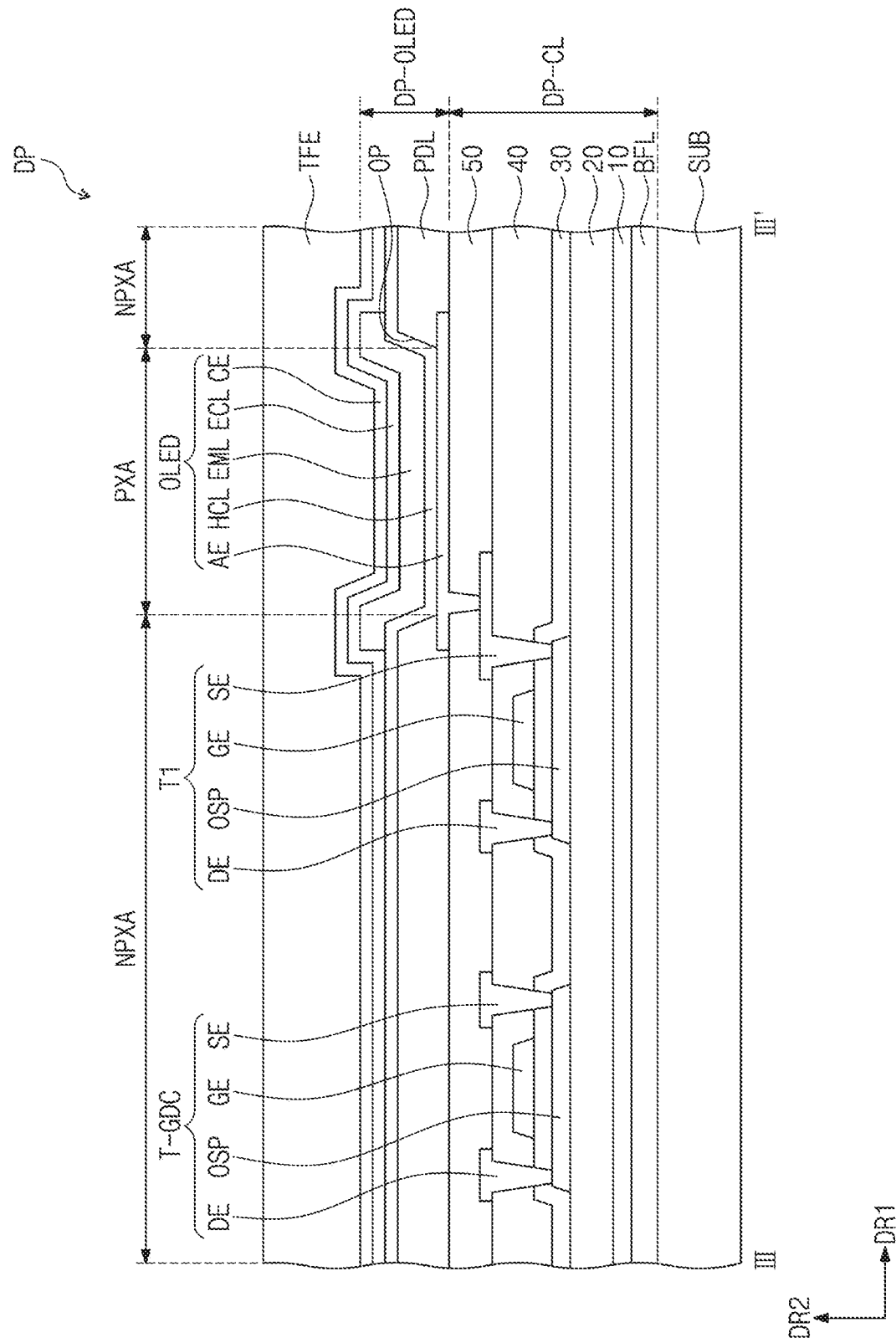

DISPLAY DEVICE

CROSS-REFERENCE TO RELATED APPLICATION

This application claims priority from and the benefit of Korean Patent Application No. 10-2016-0117895, filed on Sep. 13, 2016, which is hereby incorporated by reference for all purposes as if fully set forth herein.

BACKGROUND

Field

The invention relates generally to a display device, and more particularly, to a partially-bent display device having a narrow bezel area.

Discussion of the Background

Various display devices used for electronic devices such as televisions, mobile phones, tablet computers, navigations, and game consoles are being developed. Such an electronic device includes a display device and a protective cover for receiving the display device. Flexible display devices have been developed which allow for folding and/or bending of the display about one or more folding axes. Additionally, different electronic modules may be further included according to the type of electronic device.

The display device typically includes a display area with pixel elements to display images and a non-display area surrounding the display area called a bezel in which is provided electronic components and circuitry to drive the pixel elements. Recently, there is interest in developing a display device with a reduced bezel area.

The above information disclosed in this Background section is only for enhancement of understanding of the background of the inventive concepts, and, therefore, it may contain information that does not form prior art.

SUMMARY

Display devices constructed according to the principles of the invention are capable of providing a reduced bezel area by taking advantage of the foldable nature of flexible display panels.

In addition, display devices constructed according to the principles of the invention are capable of reducing bending stresses and providing an easily bendable, non-display area by cutting away a corner of a display module.

According to specific embodiments, display panels of the invention are capable of bending non-display areas of the display device behind the display panel without interfering with the myriad of electronic connections and without causing short circuits or creating intolerable levels of noise that can adversely affect operation of the display device Additional aspects will be set forth in the detailed description which follows, and, in part, will be apparent from the disclosure, or may be learned by practice of the inventive concepts.

According to one aspect of the invention, a display device includes: a display panel and at least one electronic component connected to the display panel. The display panel includes a display element layer and a circuit layer. The display element layer includes display elements. The circuit layer includes a display area and a non-display area peripheral to the display area. The non-display area has a first bending line and a second bending line intersecting the first bending line. The circuit layer includes an insulation layer disposed in the display area and the non-display area, pixel circuits disposed in the display area and electrically connected to the display elements a driving circuit disposed in the non-display area and electrically connected to the pixel circuits and a connection signal line disposed in the display area, disposed on a different layer from the pixel circuits, and configured to electrically connect the at least one electronic component and the driving circuit.

The non-display area may include: a first non-display area disposed at the outside of the first bending line and the inside of the second bending line and bendable about the first bending line; and a second non-display area disposed at the outside of the second bending line and the inside of the first bending line and bendable about the second bending line, wherein an intersection point of the first bending line and the second bending line may be located at the outside of the non-display area, or located at an edge of the first non-display area or an edge of the second non-display area.

The pixel circuit may include a first thin film transistor disposed on a base layer. The connection signal line may be disposed between the base layer and the first thin film transistor. The insulation layer comprises a first insulation layer disposed between the connection signal line and the first thin film transistor.

The driving circuit may include a second thin film transistor disposed on the same layer structure as the first thin film transistor.

The circuit layer may further comprises a noise shielding element disposed between the first insulation layer and the first thin film transistor overlapping the connection signal line. The insulation layer further comprises second insulation layer may disposed between the noise shielding element and the first thin film transistor.

The non-display area may include: a first non-display area disposed at the outside of the first bending line and the inside of the second bending line and bendable about the first bending line; and a second non-display area disposed at the outside of the second bending line and the inside of the first bending line and bendable about the second bending line, wherein an edge of the first non-display area and an edge of the second non-display area connected to the edge of the first non-display area may define a cut area of the non-display area; and an intersection point of the first bending line and the second bending line may be located in the cut away area or located at the edge of the first non-display area or the edge of the second non-display area.

The at least one electronic component may include a flexible circuit board electrically connected to the connection signal line.

The circuit layer may further include signal lines may including intersecting and insulated gate lines and data lines; and the data lines may be connected to the flexible circuit board and the gate lines are connected to the driving circuit.

The connection signal line may include a clock signal line.

The display elements may include an organic light emitting diode.

According to another aspect of the invention, a display device includes: a display panel including a circuit layer and a display element layer, wherein the circuit layer includes a display area, a first non-display area defined at the outside of a first bending line and the inside of a second bending line intersecting the first bending line and bendable about the first bending line, and a second non-display area defined at the outside of the second bending line and the inside of the first bending line and bendable about the second bending line; and an electronic component connected to the first non-display area, wherein the circuit layer includes: an insulation layer disposed in the display area and the non-display area; a pixel circuit disposed in the display area and electrically connected to the display element layer; and a connection signal line overlapping the display area, the first non-display area, and the second non-display area, and disposed on a different layer than the pixel circuit.

The display device may further include a driving circuit disposed in the second non-display area, wherein the connection signal line electrically connects the electronic component and the driving circuit.

The driving circuit may be disposed on the same layer as the pixel circuit.

An intersection point of the first bending line and the second bending line may be located at the outside of the first non-display area and the second non-display area, or located at an edge of the first non-display area or an edge of the second non-display area.

The pixel circuit may include a first thin film transistor disposed on a base layer. At least a portion of the connection signal line may be disposed between the base layer and the first thin film transistor. The insulation layer comprises a first insulation layer disposed between the connection signal line and the first thin film transistor.

The connection signal line may include: a first portion disposed between the base layer and the pixel circuit thin film transistor; a second portion disposed on the same layer as an electrode of the pixel circuit thin film transistor and configured to connect the electronic component and the first portion; and a third portion disposed on the same layer as the electrode of the pixel circuit thin film transistor and configured to connect the driving circuit and the first portion.

The circuit layer may further comprises a noise shielding element disposed between the first insulation layer and the first thin film transistor and overlapping the connection signal line. The insulation layer further comprises a second insulation layer may be disposed between the noise shielding element and the first thin film transistor.

The electronic component may include a flexible circuit board electrically connected to the connection signal line.

The connection signal line may include a plurality of lines and at least one of the plurality of connection signal lines may receive an AC signal.

The display elements may include an organic light emitting diode.

According to yet a further aspect of the invention, a display panel may include a display area and a non-display area peripheral to the display area and a flexible circuit board connected to the display panel. The display panel includes an organic light emitting diode disposed in the display area, a first thin film transistor disposed in the display area and connected to the organic light emitting diode, a gate driving circuit disposed in the non-display area, a connection signal line disposed in the display area. The connection signal line is disposed on a different layer from the first thin film transistor, and electrically connects the flexible circuit board and the gate driving circuit.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIG. 1 is a perspective view of an electronic device constructed according to the principles of the invention;

FIG. 2A is a plan view illustrating the front of an exemplary display device constructed according to principles of the invention in an unfolded position;

FIG. 2B is a plan view illustrating the display device of FIG. 2A in a bent position;

FIG. 6B is a partial sectional view of the display panel of FIG. 4A taken along line III-III';

Figure 3:
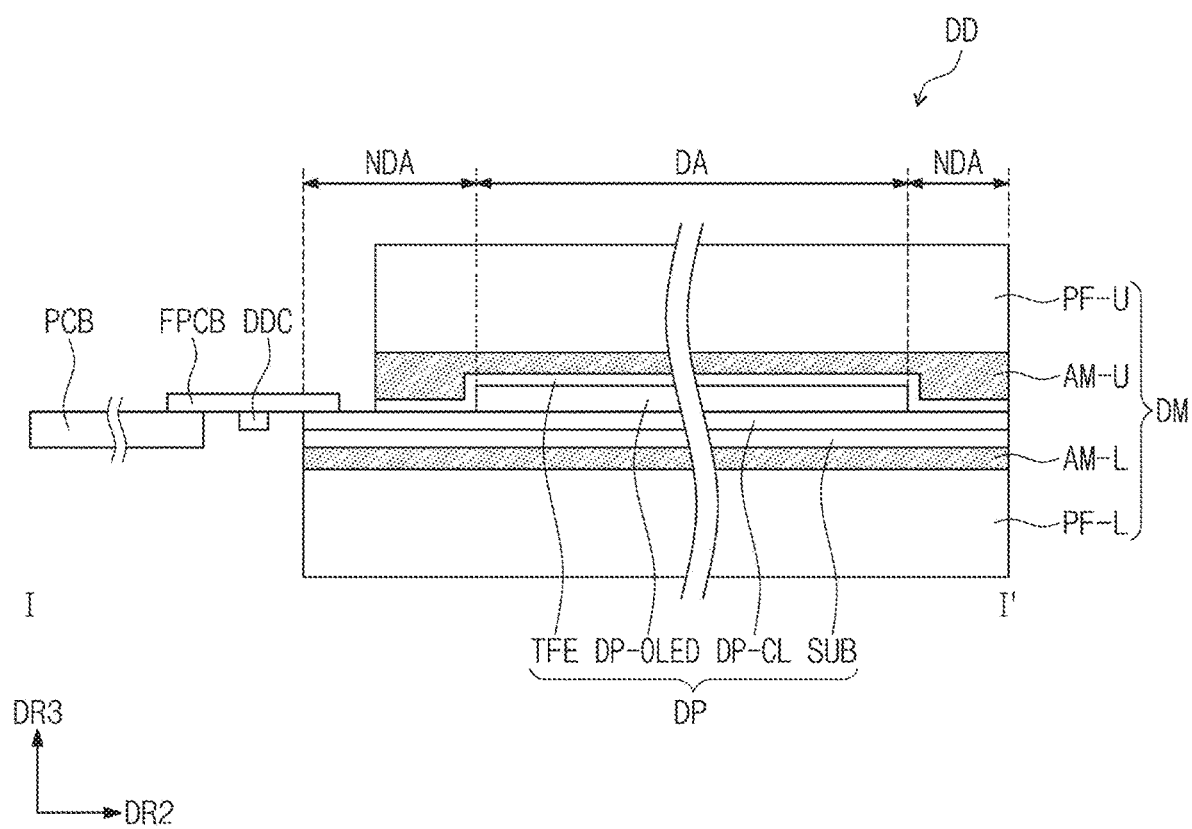
FIG. 3 is a cross-sectional view of the display device of FIG. 2A taken along line I-I'.

DETAILED DESCRIPTION OF THE
ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a perspective view of an electronic device ED constructed according to the principles of the invention. FIG. 1 illustrates a monitor as one example of the electronic device ED. Although a display device providing a flat display surface is shown in this embodiment, the inventive concepts are not limited thereto. The electronic device ED according to this embodiment may have a curved display surface. The inventive concepts may be applied to small-sized electronic devices such as mobile phones, tablets, game consoles, and smart watches in addition to large-sized electronic devices such as notebooks and televisions.

The electronic device ED may include a display surface that define a first direction axis DR1 and a second direction DR2 axis. The normal direction of the display surface, that is, a thickness direction of the electronic device ED, indicates a third direction axis DR3. The front surface (or an upper surface) and the rear surface (or a lower surface) of each member extend in the third direction axis DR3. However, the directions that the first to third direction axes DR1, DR2, and DR3 indicate may be converted to other directions as a relative concept. Hereinafter, first to third directions refer to the same reference numerals of the respective directions that the first to third direction axes DR1, DR2, and DR3 define.

The electronic device ED includes a window WM and a protection cover PC. Also, the electronic device includes a bezel BZ, which is an area on the front surface of the electronic device ED that has no pixels and does not display any images. The electronic device ED further includes a display device and an electronic module disposed inside the protection cover PC. The window WM may be coupled to the display device received inside the protection cover PC. The window WM may provide a display surface.

The window WM may be a glass substrate or a plastic substrate. The protection cover PC may be a plastics assembly, a metal assembly, or a plastic-metal assembly. The protection cover PC may include a plurality of parts coupled to each other. A portion of the protection cover PC may be disposed on the front of the electronic device ED to define its bezel BZ as shown in FIG. 1. Without a protection cover, the bezel BZ may be defined along the edge area of the window WM. For example, the bezel BZ may be disposed in an edge area of the window WM to prevent the non-display area NDA of a display device described later from being seen from the outside.

FIG. 2A is a plan view illustrating the front of an exemplary display device DD constructed according to the principles of the invention in an unfolded position. FIG. 2B is a plan view illustrating the display device DD of FIG. 2A in a bent position. FIG. 3 is a cross-sectional view of the display device DD of FIG. 2A taken along line I-I'.

As shown in FIGS. 2A to 3, the display device DD includes a display module DM. Referring to FIG. 3, the display module DM may include a display panel DP and protective members PF-U and PF-L. The display device DD may further include electronic components PCB and FPCB connected to the display module DM. The electronic components FPCB and PCB may include a flexible circuit board FPCB connected to the display module DM and a main circuit board PCB connected to the flexible circuit board FPCB. A driving circuit for driving the display module DM, for example, a data driving circuit DDC, may be mounted on the flexible circuit board FPCB. A signal control circuit SCC may be mounted on the main circuit board PCB. The signal control circuit SCC may include a timing controller.

As shown in FIG. 3, the display panel DP includes a base layer SUB, a circuit layer DP-CL disposed on the base layer SUB, a display element layer DP-OLED, and a thin film sealing layer TFE. While the display panel DP is illustrated as having a stacked, layer structure, the invention is not limited thereto and the panel may be formed from other structures as known in the art.

The base layer SUB may include at least one plastic film. The base layer SUB may include a plastic substrate, a glass substrate, a metal substrate, or an organic/inorganic composite material substrate as a flexible substrate.

The circuit layer DP-CL may include at least one intermediate insulation layer, a plurality of conductive layers, and a semiconductor layer. The plurality of conductive layers of the circuit layer DP-CL may constitute signal lines or a pixel circuit. The display element layer DP-OLED includes a display element, for example, organic light emitting diodes. However, the display element, for example, may include or take the form of another type of light emitting display element. For example, the display element may include or be a quantum dot light emitting element. In relation to the quantum dot light emitting element, the light emitting layer includes quantum dots and quantum rods. Hereinafter, the display panel DP is described as an organic light emitting display panel. The thin film sealing layer TFE seals the display element layer DP-OLED as is known in the art.

Although not shown separately, the display module DM may further include a touch detection unit for obtaining coordinate information of an external input. The display module DM may further include an anti-reflective layer. The anti-reflective layer may include a color filter or a stacked, layer structure of conductive layer/insulation layer/conductive layer. The anti-reflective layer may reduce an external light reflectance by absorbing, destructive-interfering, or polarizing the light incident from the outside. The anti-reflective layer may include an optical member such as a polarizing plate The touch detection unit and the anti-reflective layer may be disposed between any one protective member PF-U and the display panel DP. The optical member may constitute a part of the protective member PF-U.

The protective members PF-U and PF-L may be provided in a plurality. The protective members PF-U and PF-L may include a first protective member PF-U disposed on a first surface of the display panel DP and a second protective member PF-L disposed on a second surface of the display panel DP. The first protective member PF-U and the second protective member PF-L face each other with the display panel DP therebetween in the third direction DR3. In this embodiment, the display panel DP displays an image toward the first protective member PF-U.

The protective members PF-U and PF-L may include a plastic film including one selected from the group consisting of polyethersulfone (PES), polyacrylate, polyetherimide (PEI), polyethylenenaphthalate (PEN), polyethyleneterephthalate (PET), polyphenylene sulfide (PPS), polyarylate, polyimide (PI), polycarbonate (PC), poly(arylene ethersulfone), and a combination thereof. The material constituting the protective members PF-U and PF-L is not limited to plastic resins and may include an organic/inorganic composite material. The protective members PF-U and PF-L may include an inorganic material filled in the pores of a porous organic layer and an organic layer. The protective members PF-U and PF-L may have a single layer or multi-layer structure.

The first protective member PF-U and the display panel DP may be coupled to each other through a first adhesive member AM-U and the second protective member PF-L and the display panel DP may be coupled to each other through a second adhesive member AM-L. Each of the first adhesive member AM-U and the second adhesive member AM-L may be an Optically Clear Adhesive (OCA) film, Optically Clear Resin (OCR), or a Pressure Sensitive Adhesive (PSA) film. Each of the first adhesive member AM-U and the second adhesive member AM-L may include a photo-curing adhesive material or a heat curing adhesive material and its material is not particularly limited.

The configuration of the display module DM will be described in more detail with reference to plan views of FIGS. 2A and 2B The display module DM includes a display area DA and a non-display area NDA. The non-display area NDA is an area disposed around the display area DA. The display area DA displays an image and the non-display area NDA displays no image. The planar configuration of the display module DM may identically correspond to the planar configuration of the display panel DP and the protection members PF-U and PF-L, which are layers constituting the display module DM, as shown best in FIG. 3, For example, the display area DA and the non-display area NDA may identically correspond to the planar configuration of the circuit layer DP-CL of the display panel DP.

A plurality of bending lines may be disposed in the non-display area NDA. Each bending line may be an imaginary reference line along which the display module DM is bent. The plurality of bending lines may include a first bending line BL1 and a second bending line BL2 intersecting each other. The first bending line BL1 may be parallel to the first direction axis DR1 and the second bending line BL2 may be parallel to the second direction axis DR2. The first bending line BL1 and the second bending line BL2 may be orthogonal to each other.

The non-display area NDA may include a plurality of non-display areas divided by a bending line. The non-display area NDA includes a first non-display area NDA-O1 and a second non-display area NDA-O2. The non-display area NDA may further include a peripheral non-display area NDA-I. However, when the first bending line BL1 and the second bending line BL2 form the outermost boundary of the display module DM, that is the display area DA and the non-display area NDA, the peripheral non-display area NDA-I may be omitted.

The first non-display area NDA-O1 is disposed at the outside of the first bending line BL1 and the inside of the second bending line BL2. The area "outside of a bending line" is defined herein as an area where no pixel PX is disposed and the area "inside of a bending line" is defined as an area where a pixel PX is disposed. Thus, the first non-display area NDA-O1 may be bent about the first bending line BL1, whereby the first non-display area NDA-O1 may be bent toward the inside of the first bending line BL1 to occupy a position overlapping the display. The second non-display area NDA-O2 is disposed at the outside of the second bending line BL2 and the inside of the first bending line BL1. Thus, the second non-display area NDA-O2 may be bent about the second bending line BL2, whereby the second non-display area NDA-O2 may be bent toward the inside of the second bending line BL2 to occupy a position overlapping the display.

As shown in FIG. 2B, the first non-display area NDA-O1 is bent outwardly from the display area DA about the first bending line BL1 and the second non-display area NDA-O2 is bent outwardly from the display area DA about the second bending line BL2. In this embodiment, "outer bending" is defined as that "different parts of the second protective member PF-L (see FIG. 3) are bent to be closer to each other and different parts of the first protective member PF-U (see FIG. 3) are bent to be away from each other. "Inner bending" may be defined as bending in the opposite direction of "outer bending".

A cut area NDA-C is formed in a corner of the non-display area NDA. Substantially, the cut area NDA-C is an area where no display module DM exists. The cut area NDA-C is defined at the outside of the second bending line BL2 and the outside of the first bending line BL1.

The flexible circuit board FPCB may be coupled to the first non-display area NDA-O1 and a driving circuit, for example, the gate driving circuit GDC, which may be disposed in the second non-display area NDA-O2. Although one gate driving circuit GDC is illustrated in this embodiment, one or more other driving circuits may be further disposed in an adjacent, non-display area in the first direction DR1.

Signal lines may be disposed in the display area DA and the non-display area NDA. A pixel PX is disposed in the display area DA. The signal lines may include data lines DL and gate lines GL electrically connected to the pixel PX. The data lines DL and the gate lines GL intersect and are insulated from each other. The data lines DL and the gate lines GL intersect and are insulated from each other.

One pixel PX and one data line DL and gate line GL are exemplarily shown in FIG. 2. The pixel PX includes a pixel circuit and a display element.

The data line DL connects the flexible circuit board FPCB and the pixel PX electrically. The gate line GL connects the gate driving circuit GDC and the pixel PX electrically. The data line DL and the gate line GL provide a data signal and a gate signal to the pixel PX. A pixel circuit may provide a signal corresponding to a data signal to a display element in response to a gate signal. According to the configuration of a pixel circuit, the number of signal lines may be increased or reduced.

Signal lines include a connection signal line CL disposed in the display area DA and the non-display area NDA. The connection signal line CL may commonly overlap the display area DA, the first non-display area NDA-O1, and the second non-display area NDA-O2. The connection signal line CL passes through a display area to deliver signals to different non-display areas. The connection signal line CL may connect the gate driving circuit GDC and the flexible circuit board FPCB. The connection signal line CL may deliver control signals necessary for an operation of the gate driving circuit GDC.

Figure 4:
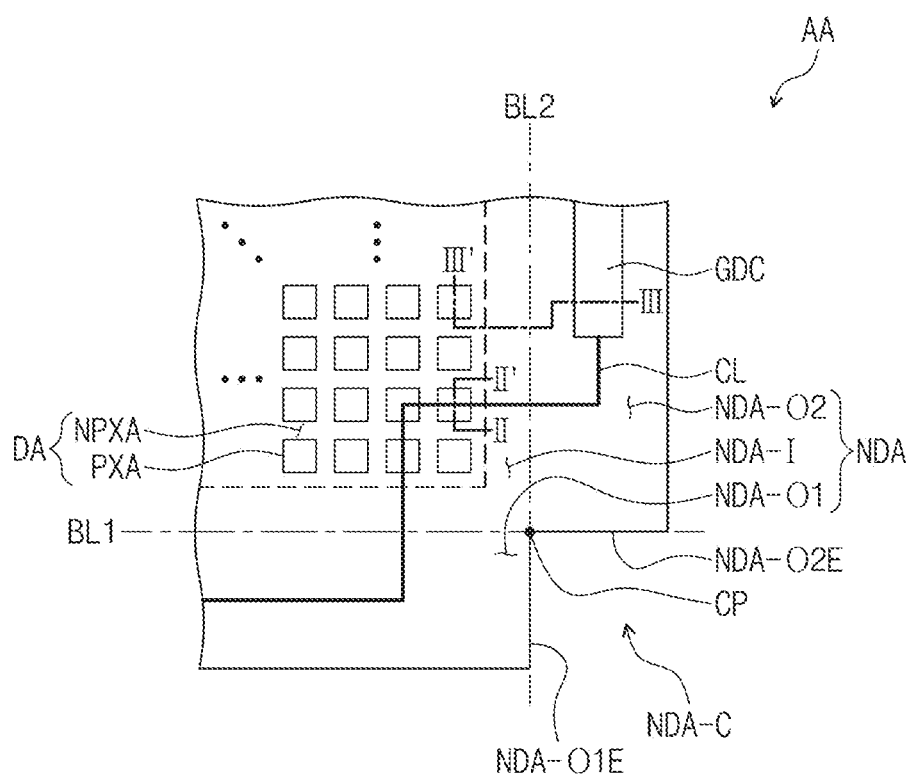
FIG. 4 is a partial plan view of area AA of the display panel of FIG. 2A.
Figure 5:
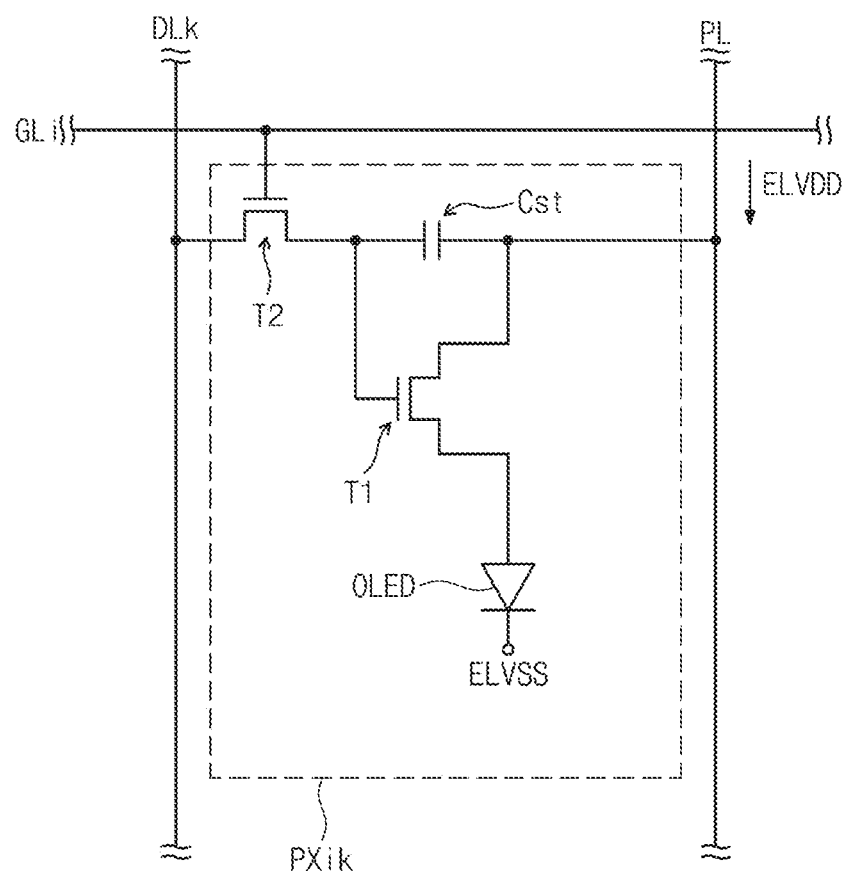
FIG. 5 is an exemplary, equivalent circuit diagram of a pixel that may used in a display device of the invention.
Figure 6A:
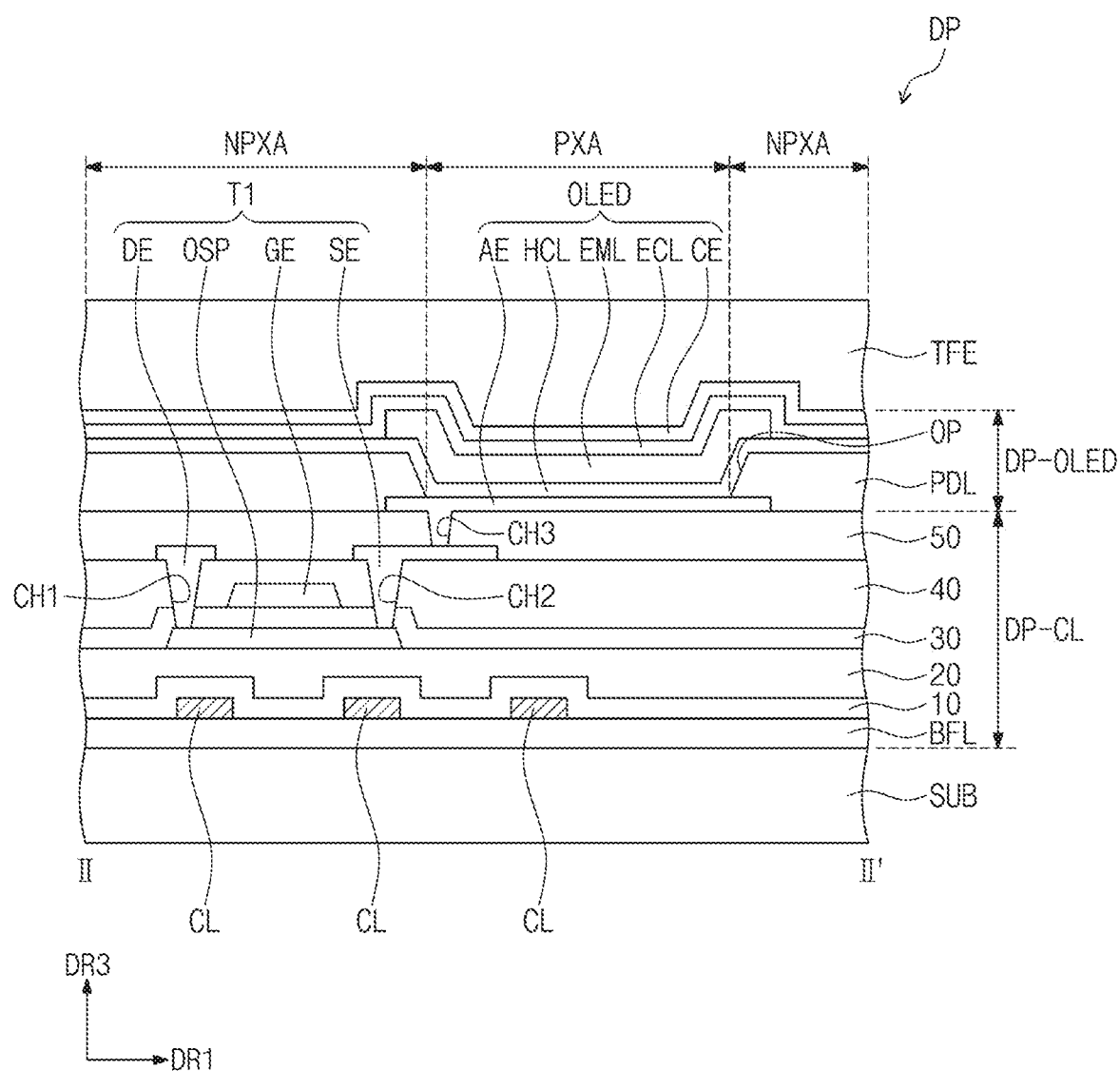
FIG. 6A is a partial sectional view of the display panel of FIG. 4A taken along line II-II'.

FIG. 4 is a partial plan view of area AA of the display panel DP of FIG. 2A. FIG. 5 is an exemplary equivalent circuit diagram of a pixel PX that may used in a display device of the invention. FIG. 6A is a partial cross-sectional view of the display panel DP of FIG. 4A taken along the line II-II'. FIG. 6B is a partial cross-sectional view of the display panel of FIG. 4A taken along line III-III'

As shown in FIG. 4, the display area DA may include a plurality of light emitting areas PXA and a non-light emitting area NPXA adjacent to the plurality of light emitting areas PXA. The non-light emitting area NPXA may surround the plurality of light emitting areas PXA. The pixel PX (shown in FIG. 1) is disposed at each of the plurality of light emitting areas PXA. In this embodiment, the plurality of light emitting areas PXA may be defined corresponding to a partial area of the first electrode AE exposed by an opening part OP (see FIGS. 6A and 6B).

As shown in FIG. 4, the connection signal line CL overlaps some of the light emitting areas PXA. Although one connection signal line CL is shown in FIG. 4, the connection signal line CL may include a plurality of signal lines. As described later, the connection signal line CL is insulated from the pixel circuits. The connection signal line CL is disposed on a different layer than the pixel circuits.

The cut area NDA-C is defined by an edge NDA-O1E (hereinafter referred to as a first edge) of the first non-display area NDA-O1 and an edge NDA-O2E (hereinafter referred to as a second edge) of the second non-display area NDA-O2 connected to an edge of the first edge NDA-O1E. The first edge NDA-O1E and the second edge NDA-O2E may overlap the second bending line BL2 and the first bending line BL1, respectively.

An intersection point CP of the first bending line BL1 and the second bending line BL2 may be define at the point where the first edge NDA-O1E and the second edge NDA-O2E intersect. In this exemplary embodiment, the intersection point CP is the point where the first edge NDA-O1E and the second edge NDA-O2E are connected. The intersection point CP may be defined in the cut area NDA-C. That is, the intersection point CP may be defined at the outside of the non-display area NDA.

As the corner area of the display module DM is cut away, the non-display area NDA may be bent easily. Even if a non-display area is bent by two or more bending lines, a specific area may not be damaged by stress. In general, as bending is made by two or more bending lines, a corner area of the display module DM undergoes great stress, but according to this embodiment, since the corner area is removed, no issue of stress arises.

FIG. 5 shows an equivalent circuit of an exemplary, typical pixel PXik connected to the ith gate line GLi and the kth data line DLk. The pixel PXik includes a display element and a pixel circuit electrically connected to the display element. For example, the display element may be an organic light emitting diode OLED. The organic light emitting diode OLED may be a front-light-emitting-type diode or a rear-light-emitting-type diode. The organic light emitting diode OLED is included in the display element layer DP-OLED shown in FIG. 3.

The pixel circuit, as a driving circuit for driving the organic light emitting diode OLED, includes a first transistor T1 (or a driving transistor), a second transistor T2 (or a switching transistor), and a capacitor Cst. In this embodiment, the first transistor T1 and the second transistor T2 may be defined as a pixel circuit thin film transistor. The pixel circuit is included in the circuit layer DP-CL shown in FIG. 3.

The first transistor T1 outputs a data signal applied to the kth data line DLk in response to a gate signal applied to the ith gate line GLi. The capacitor Cst charges a voltage corresponding to a data signal received from the second transistor T2.

The first transistor T1 controls a driving current flowing through the organic light emitting diode OLED in correspondence to a charge amount stored in the capacitor Cst. The organic light emitting diode OLED receives a first voltage ELVDD and a second voltage ELVSS having a lower level than the first voltage ELVDD. The first voltage ELVDD may be received from the power line PL. The organic light emitting device OLED may emit light during a turn-on section of the first transistor T1.

FIG. 6A illustrates a light emitting area PXA where a connection signal line CL overlaps. FIG. 6B illustrates a light emitting area PXA where no connection signal line CL overlaps. Additionally, FIG. 6B illustrates a portion of a gate driving circuit GDC.

As shown in FIGS. 6A and 6B, a buffer layer BFL may be disposed on a base layer SUB. The buffer layer BFL improves the coupling strength of the base layer SUB and conductive patterns. The buffer layer BFL may include an inorganic layer. Although not shown separately in the drawing, a barrier layer for preventing a foreign material from entering may be further disposed on an upper surface of the base layer SUB. The buffer layer BFL and the barrier layer may be selectively disposed/omitted.

Connection signal lines CL are disposed on the buffer layer BFL. Three connection signal lines CL are shown exemplarily. A first insulation layer 10 for covering the connection signal lines CL is disposed on the buffer layer BFL. The connection signal line CL is disposed between the base layer SUB and the pixel circuit. As one example of the pixel circuit, a pixel circuit thin film transistor T1 is shown. The pixel circuit thin film transistor T1 may correspond to the first transistor T1 in FIG. 5. The first insulation layer 10 is disposed between the connection signal line CL and the pixel circuit thin film transistor T1. The first insulation layer 10 may include an inorganic layer and/or an organic layer. The first insulation layer 10 may have a single layer or multilayer structure.

A second insulation layer 20 is disposed on the first insulation layer 10. The second insulation layer 20 may provide a flat surface. The second insulation layer 20 may include an inorganic layer and/or an organic layer. The second insulation layer 20 may have a single layer or multilayer structure. The second insulation layer 20 is optional and may be omitted.

A semiconductor pattern OSP of the pixel circuit thin film transistor T1 is disposed on the second insulation layer 20. A third insulation layer 30 for covering the semiconductor pattern OSP is disposed on the second insulation layer 20. The third insulation layer 30 may include an inorganic layer and/or an organic layer. A control electrode GE of the pixel circuit thin film transistor T1 is disposed on the third insulation layer 30. The control electrode GE may be manufactured through the same photolithography process as the gate line GLi (see FIG. 5).

A fourth insulation layer 40 for covering the control electrode GE may be disposed on the third insulation layer 30. The fourth insulation layer 40 may include an inorganic layer and/or an organic layer. The fourth insulation layer 40 may provide a flat upper surface.

An input electrode SE and an output electrode DE of the pixel circuit thin film transistor T1 is disposed on the fourth insulation layer 40. The input electrode SE may be manufactured through the same photolithography process as the data line DLk (see FIG. 5).

Each of the input electrode SE and the output electrode DE is connected to the semiconductor pattern OSP through a first contact hole CH1 and a second contact hole CH2 penetrating the third insulation layer 30 and the fourth insulation layer 40. On the other hand, the pixel circuit thin film transistor T1 may be modified an implemented as a bottom gate structure.

A fifth insulation layer 50 for covering the input electrode SE and the output electrode DE is disposed on the fourth insulation layer 40. The fifth insulation layer 50 may include an organic layer and/or an inorganic layer. In particular, the fifth insulation layer 50 may include an organic material for providing a flat surface. The fifth insulation layer 50 is optional and may be omitted. The output electrode DE and a first electrode AR, described later, may be integrally formed.

A pixel definition layer PDL and an organic light emitting diode OLED are disposed on the fifth insulation layer 50. A first electrode AE is disposed on the fifth insulation layer 50. The first electrode AE is connected to the output electrode DE through a third contact hole CH3 penetrating the fifth insulation layer 50. An opening part OP is defined in the pixel definition layer PDL. The opening part OP of the pixel definition layer PDL exposes at least a part of the first electrode AE.

A hole control layer HCL may be commonly disposed in the light emitting area PXA and the non-light emitting area NPXA. Although not shown in the drawing separately, a common layer such as the hole control layer HCL may be commonly formed in the display area DA (see FIG. 4). A light emitting layer EML is disposed on the hole control layer HCL. The light emitting layer EML may be disposed in an area corresponding to the opening part OP. An electronic control layer ECL is disposed on the light emitting layer EML. Although not shown in the drawing separately, the electronic control layer ECL may be commonly formed in the display area DA (see FIG. 4). The second electrode CE is disposed on the electronic control layer ECL. The second electrode CE is commonly disposed at the display area DA.

A thin film sealing layer TFE is disposed on the second electrode CE. The thin film sealing layer TFE includes an inorganic layer and an organic layer. The thin film sealing layer TFE may include at least two inorganic layers and an organic layer therebetween. The inorganic layers protect the display element layer DP-OLED from moisture/oxygen and the organic layer protects the display element layer DP-OLED from a foreign material such as dust particles. The inorganic layer may include a silicon nitride layer, a silicon oxynitride layer, and a silicon oxide layer, a titanium oxide layer, or an aluminum oxide layer. The organic layer may include an acryl-based organic layer, but is not limited thereto. Other layers may be further disposed on the thin film sealing layer TFE as is known in the art.

The gate driving circuit GDC may include a plurality of thin film transistors formed through the same process as the pixel circuit thin film transistor T1. FIG. 6B illustrates one driving circuit thin film transistor T-GDC exemplarily. The driving circuit thin film transistor T-GDC may have the same structure as the pixel circuit thin film transistor T1. In such a way, the gate driving circuit GDC may be disposed on the same layer as the pixel circuit.

Figure 7:
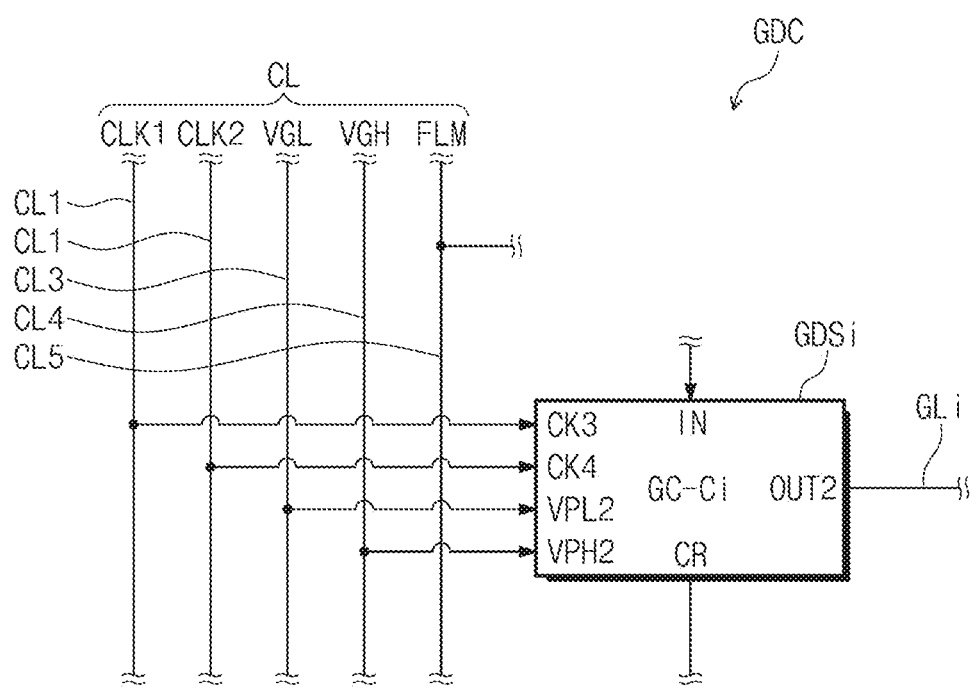
FIG. 7 is a block diagram of an exemplary gate driving circuit that may be used in a display device of the invention.

FIG. 7 is a block diagram of an exemplary gate driving circuit GDC that may be used in a display device of the invention. The gate driving circuit GDC may include a plurality of driving stages to output gate signals. FIG. 7 illustrates the ith driving stage GDSi for outputting the ith gate signal exemplarily, where i is a natural number of two or more.

The driving stage GDSi may receive gate control signals CLK1, CLK2, VGH, VGL, and FLM through a first clock signal line CL1, a second clock signal line CL2, a first voltage line CL3, a second voltage line CL4, and a start signal line CL5, which may be collectively designated as connection line CL. The gate control signals CLK1, CLK2, VGH, VGL, and FLM may include AC signals. The gate control signals CLK1, CLK2, VGH, VGL, and FLM may include a first clock signal CLK and a second clock signal CLK2 having different phases. The gate control signals CLK1, CLK2, VGH, VGL, and FLM may include a first bias voltage VGL and a second bias voltage VGH having a different level than the first bias voltage VGL. The gate control signals CLK1, CLK2, VGH, VGL, and FLM may include a start signal FLM for defining one frame section.

The driving stage GDSi may include a first clock terminal CK1, a second clock terminal CK2, a first voltage input terminal VPL, a second voltage input terminal VPH, a control input terminal IN, a carry terminal CR, and an output terminal OUT. The first clock terminal CK1 receives the first clock signal CLK1 and the second clock terminal CK2 receives the second clock signal CLK2. The first voltage input terminal VPL receives the first bias voltage VGL and the second voltage input terminal VPH receives the second bias voltage VGH.

The control input terminal IN may receive a carry signal of a previous driving stage and the carry terminal CR may output a carry signal to the next gate driving stage. The output terminal OUT may provide a gate signal, which is generated from the driving stage GDSi, to the gate line GLi.

The connection signal line CL1 described with reference to FIGS. 2 and 4 may include a first clock signal line CL1, a second clock signal line CL2, a first voltage line CL3, a second voltage line CL4, and a start signal line CL5. The connection signal line may include a plurality of signal lines for delivering the gate control signals CLK1, CLK2, VGH, VGL, and FLM from the flexible circuit board FPCB to the gate driving circuit GDC.

Figure 8A:
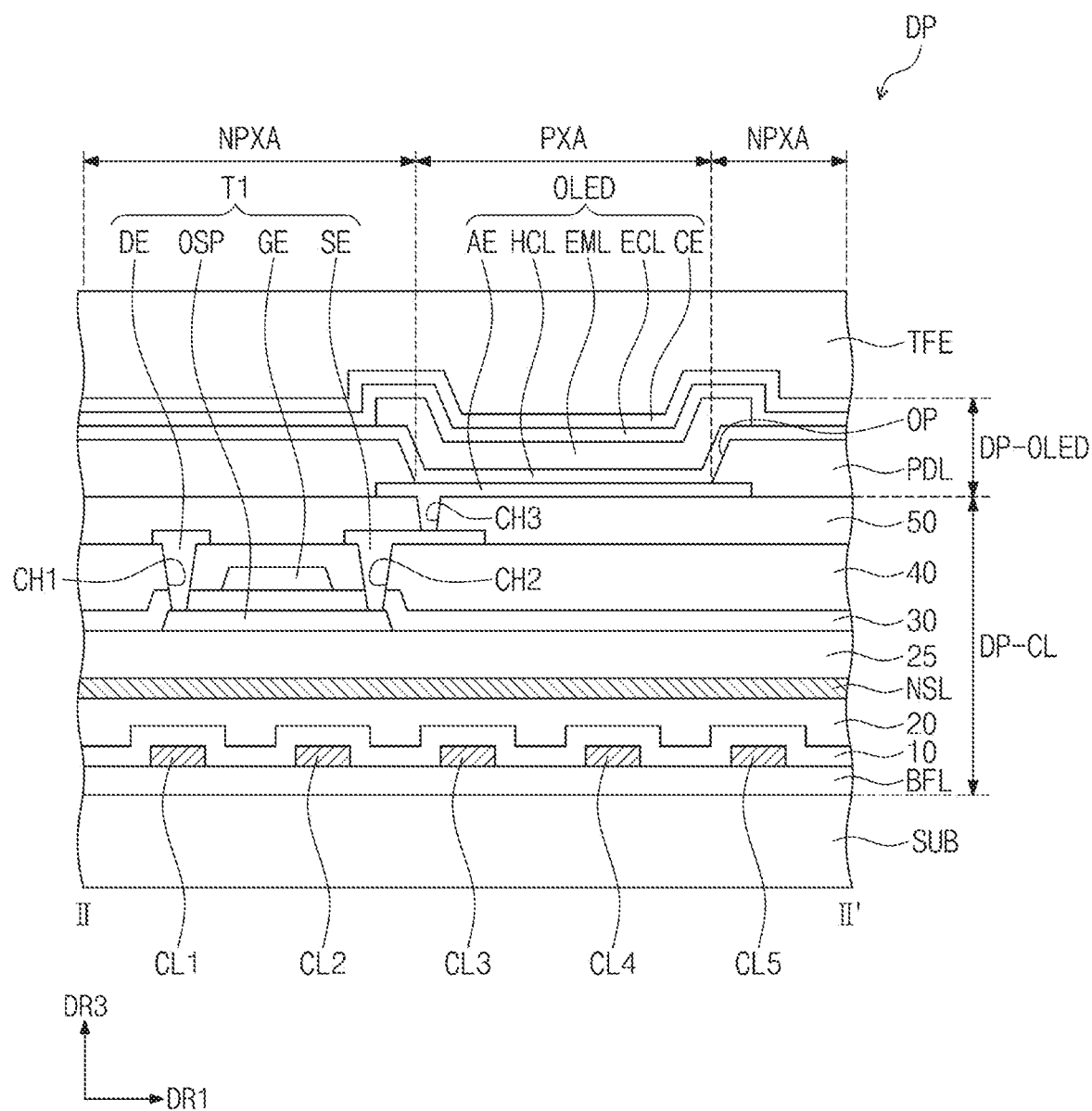
FIG. 8A is a partial sectional view of another embodiment of a display panel taken along line II-II' of FIG. 4A.
Figure 8B:
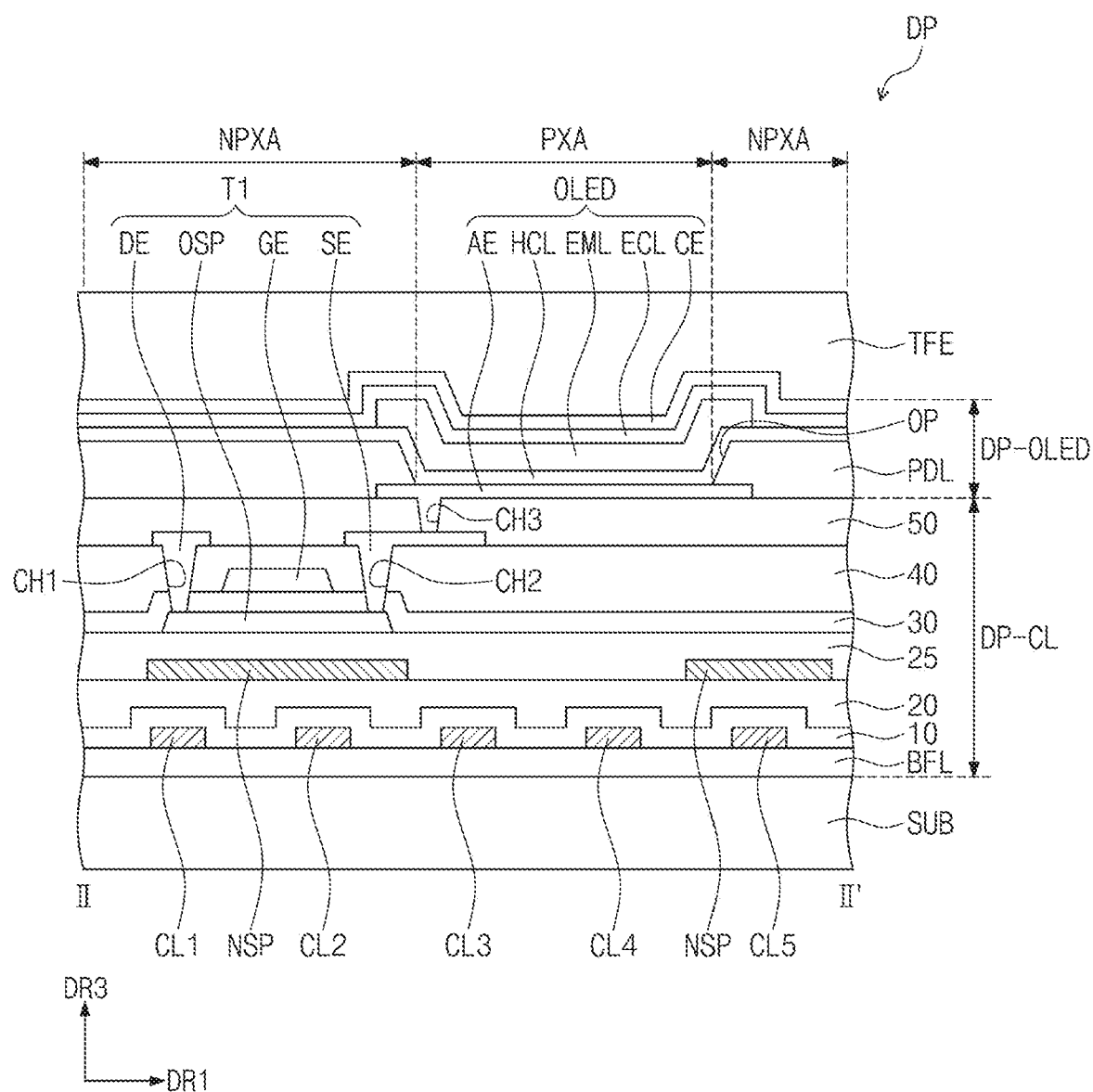
FIG. 8B is a partial sectional view of yet another embodiment of a display panel taken along line II-II' of FIG. 4A.

FIG. 8A is a partial cross-sectional view of another embodiment of display panel DP taken along line II-II' of FIG. 4A. FIG. 8B is a partial cross-sectional view of yet another embodiment of a display panel DP taken along line III-III' of FIG. 4A. FIGS. 8A and 8B show sections corresponding to FIG. 6A.

Hereinafter, detailed descriptions for the same component and/or configurations as the display panel DP of FIGS. 1 to 7 are omitted to avoid redundancy. FIGS. 8A and 8B illustrate the first clock signal line CL1, the second clock signal line CL2, the first voltage line CL3, the second voltage line CL4, and the start signal line CL5, which are described with reference to FIG. 7.

The circuit layer DP-CL is disposed between the first insulation layer and the pixel circuit and further includes a noise shielding electrode overlapping the connection signal line CL. As one example of the pixel circuit overlapping the connection signal line CL, a pixel circuit thin film transistor T1 is shown. A noise blocking electrode blocks signal interference between the pixel circuit and the connection signal line CL. The noise blocking electrode may float, be grounded, or receive a predetermined level of bias voltage. The noise blocking electrode may receive power voltages ELVDD and ELVSS or bias voltages VPH and VPL, as a bias voltage. For example, the noise blocking electrode may be formed as a layer (e.g., noise blocking layer NSL shown in FIG. 8A) or at least two patterns (e.g., NSP shown in FIG. 8B).

The noise blocking electrode may overlap signal lines where the AC signals described with reference to FIG. 7 are applied. The noise blocking electrode may overlap the first clock signal line CL1, the second clock signal line CL2, and the start signal line CL5.

As shown in FIG. 8A, the noise blocking electrode may form one layer. A noise blocking layer NSL may overlap the plurality of light emitting areas PXA and the non-light emitting area NPXA shown in FIG. 4.

As shown in FIG. 8B, the noise blocking electrode may include noise blocking patterns NSP overlapping the first clock signal line CL1, the second clock signal line CL2, and the start signal line CL5.

As shown in FIGS. 8A and 8B, the noise blocking layer NSL and the noise blocking pattern NSP may be disposed between the second insulation layer 20 and the third insulation layer 30. An interlayer insulation layer 25 for covering the noise blocking layer NSL and the noise blocking pattern NSP may be further disposed. A semiconductor pattern OSP may be disposed on the interlayer insulation layer 25.

The noise blocking layer NSL and the noise blocking pattern NSP may be disposed between the first insulation layer 10 and the second insulation layer 20. In this case, the interlayer insulation layer 25 is optional and may be omitted. However, an additional interlayer insulation layer also may be further provided.

Figure 9:
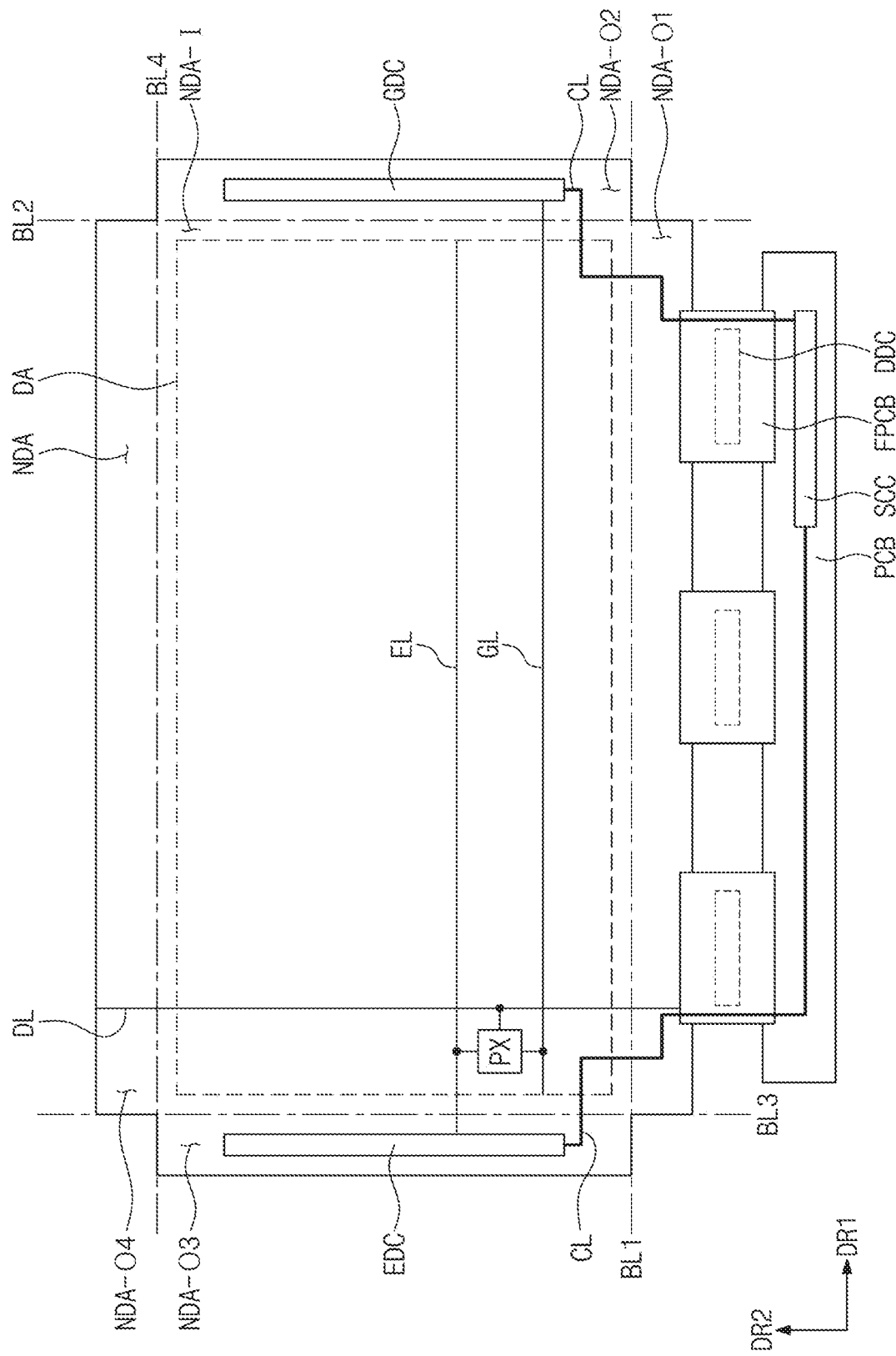
FIG. 9 is a plan view illustrating the front of another exemplary display device constructed according to principles of the invention in an unfolded position.

FIG. 9 is a plan view illustrating the front of another exemplary display device constructed according to principles of the invention in an unfolded position. Hereinafter, detailed descriptions for the same component and/or configurations as the display device DD of FIGS. 1 to 8B are omitted to avoid redundancy.

As shown in FIG. 9, a non-display area NDA may include a first non-display area NDA-O1, a second non-display area NDA-O2, a third non-display area NDA-O3, and a fourth non-display area NDA-O4. Cut away areas NDA-C are defined in four corners of the display module DM.

The first non-display area NDA-O1 is disposed at the outside of the first bending line BL1, the inside of the second bending line BL2, and the inside of the third bending line BL3. The second non-display area NDA-O2 is disposed at the outside of the second bending line BL2, the inside of the first bending line BL1, and the inside of the fourth bending line BL4. The third non-display area NDA-O3 is disposed at the outside of the third bending line BL3, the inside of the first bending line BL1, and the inside of the fourth bending line BL4. The fourth non-display area NDA-O4 is disposed at the outside of the fourth bending line BL4, the inside of the second bending line BL2, and the inside of the third bending line BL3.

A light emitting control line EL electrically connected to the pixel PX may be further disposed in the display area DA and the non-display area NDA. A light emitting control circuit EDC may be further disposed in the third non-display area NDA-O3. The light emitting control circuit EDC may sequentially provide a light emitting control signal to the plurality of light emitting control lines EL. The light emitting control circuit EDC may include a plurality of driving stages as shown in the gate driving circuit GDC described with reference to FIG. 7.

The display module DM may further include a connection signal line CL for connecting the light emitting control circuit EDC and the signal control circuit SCC.

FIGS. 10A, 10B, 10C, and 10D are partial plan views of additional embodiments of area AA of the display panel DP of FIG. 2A. FIGS. 10A to 10D are partial plan views corresponding to FIG. 4. Hereinafter, detailed descriptions for the same component and/or configurations as the display device DD of FIGS. 1 to 9 are omitted to avoid redundancy.

Figure 10A:
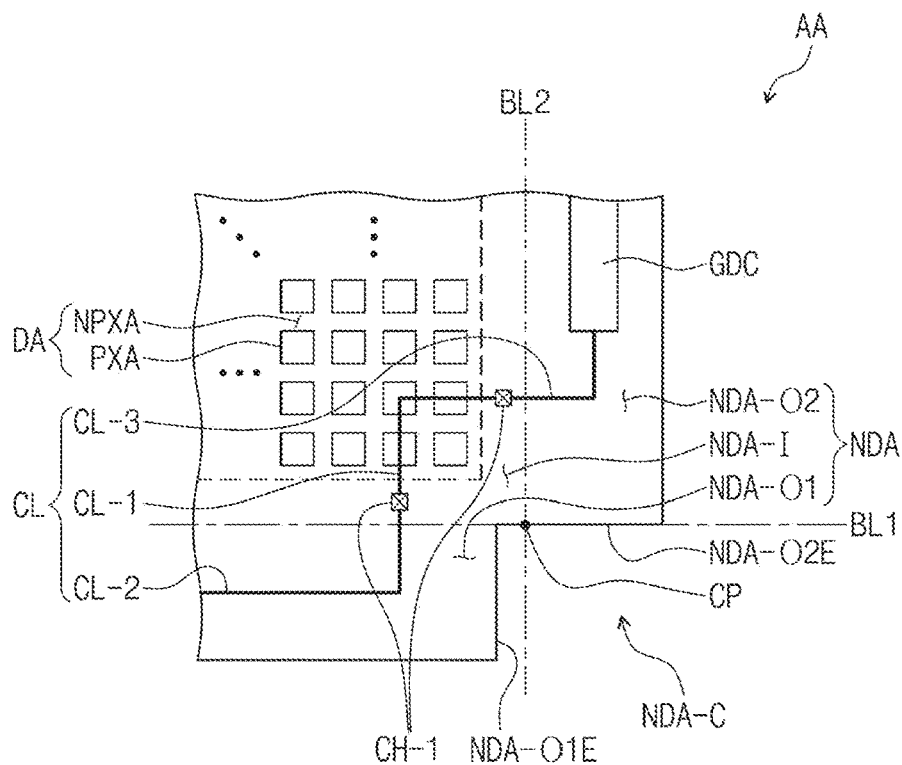
FIGS. 10A, 10B, 10C and 10D are partial plan views of additional embodiment of area AA of the display panel of FIG. 2A.
Figure 10B:
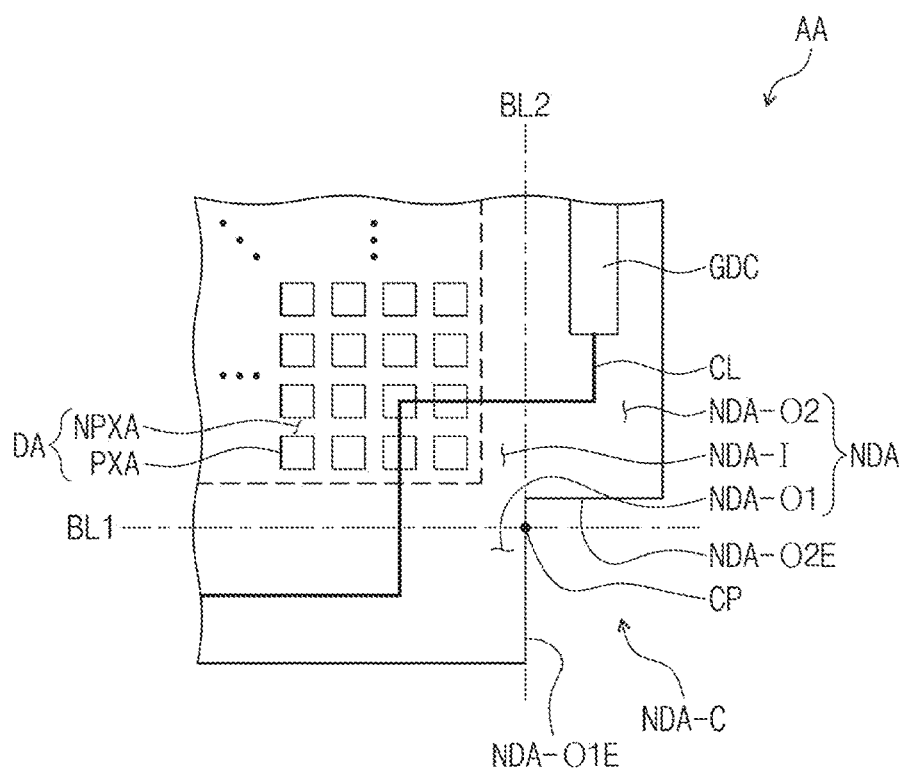
Figure 10C:
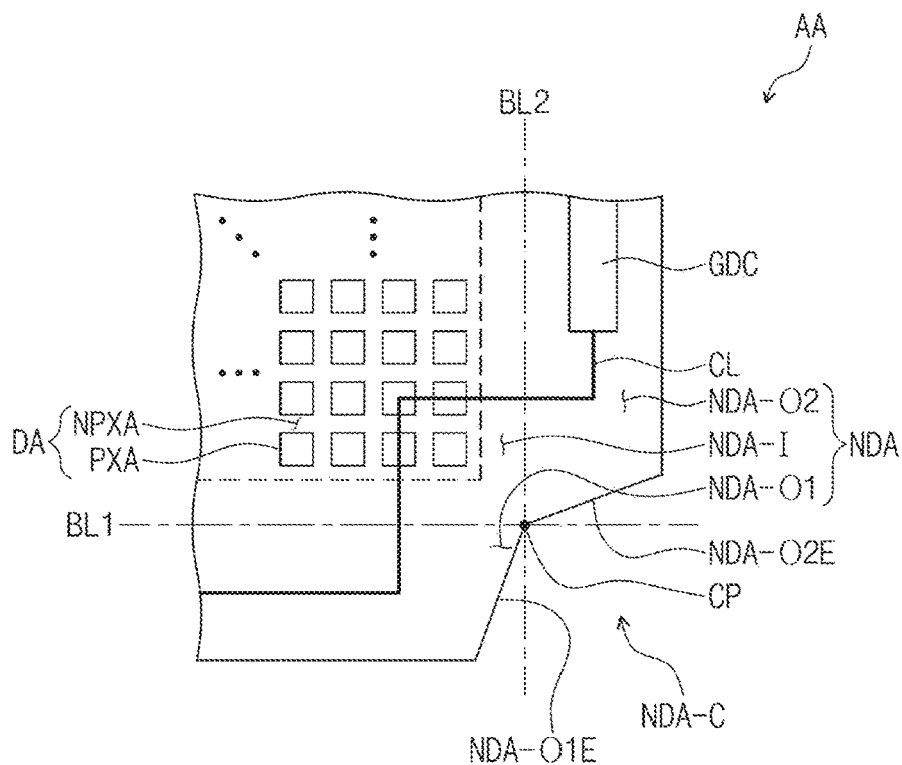
Figure 10D:
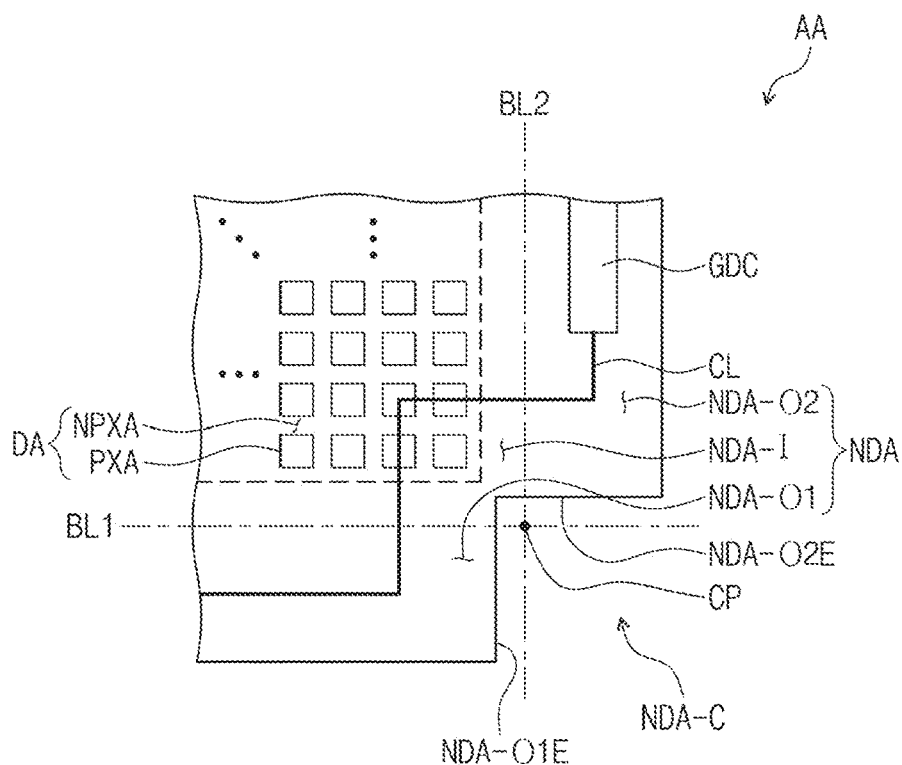

As shown in FIG. 10A, an intersection point CP may be located at a point along the second edge NDA-O2E. As shown in FIG. 10B, an intersection point CP may be located at a point along the first edge NDA-O1E. As shown in FIG. 10C, the first edge NDA-O1E and the second edge NDA-O2E may be disposed outside from and not-overlap the second bending line BL2 and the first bending line BL1. As shown in FIG. 10D, the intersection point CP may be disposed outside from and not non-overlap the non-display area NDA.

As shown in FIG. 10A, the connection signal line CL may include a plurality of portions disposed on different layers. The connection signal line CL may include a first portion CL-1 overlapping the display area DA, and a second portion CL-2 and a third portion CL-3 overlapping the non-display area NDA. The second portion CL-2 may connect the first portion CL-1 and the flexible circuit board FPCB (see FIG. 2A) and the second portion CL-2 may connect the first portion CL-1 and the gate driving circuit GDC.

The first portion CL-1 may be disposed on a different layer than the second portion CL-2 and the third portion CL-3. As shown in FIG. 6A, the first portion CL-1 may be disposed on the buffer layer BFL. The second portion CL-2 and the third portion CL-3 may be disposed on the same layer as electrodes of the pixel circuit thin film transistor T1.

At least one of the second portion CL-2 and the third portion CL-3 may be disposed on the same layer as the control electrode GE. At least one of the second portion CL-2 and the third portion CL-3 may be disposed on the same layer as the input electrode SE.

Contact holes CH-1 connecting the second portion CL-2 and the third portion CL-3 to the first portion CL-1 may penetrate some insulation layers of the first to fourth insulation layers 10 to 40 according to the positions of the second portion CL-2 and the third portion CL-3.

Although the connection signal line CL including three portions is described with reference to FIG. 10A, the inventive concepts are not limited thereto. The connection signal line CL may include two portions, or four or more portions. Additionally, referring to FIGS. 2A to 9, connection signal lines CL may include a plurality portions.

Figure 11:
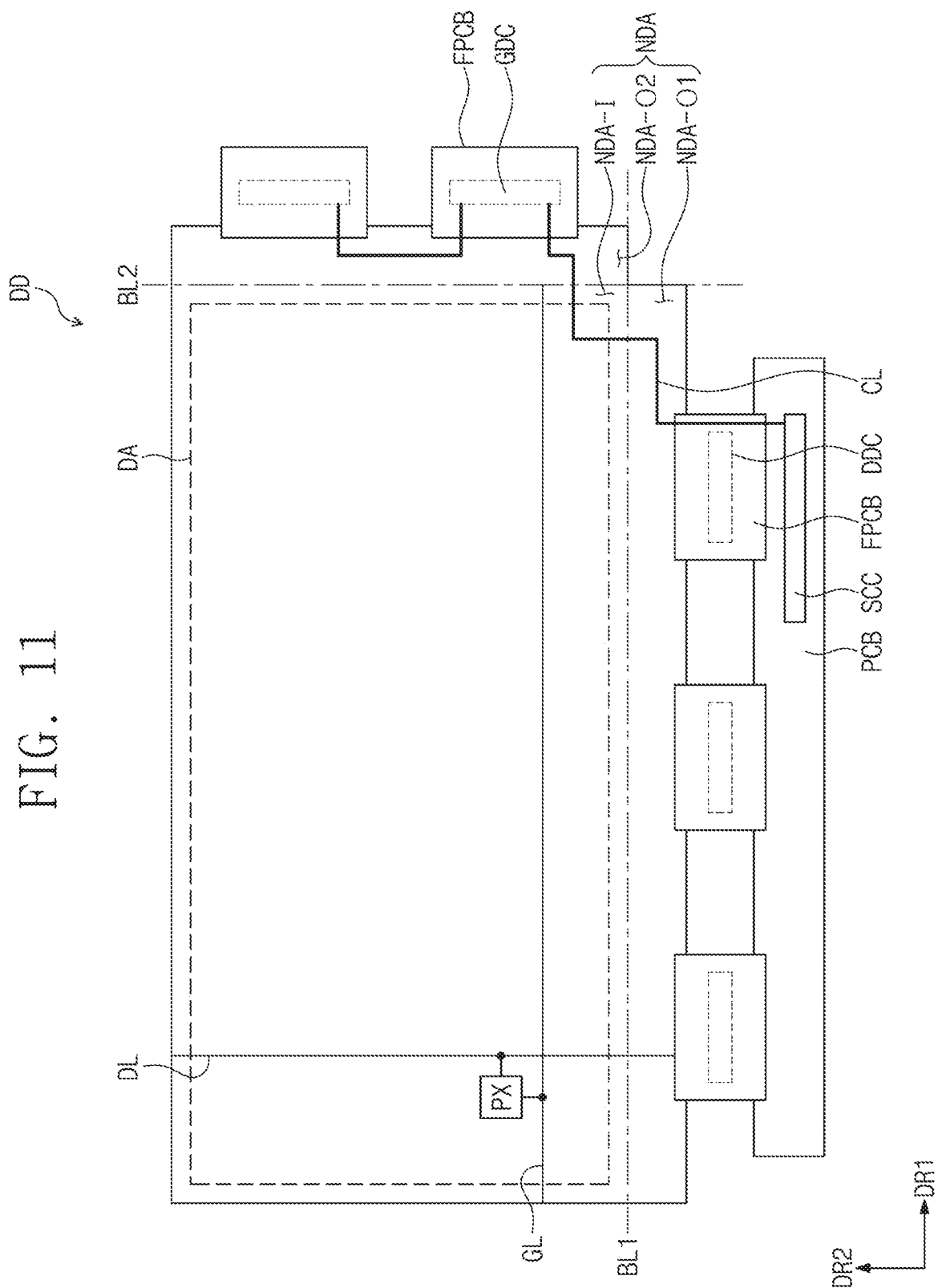
FIG. 11 is a plan view illustrating another exemplary display device of the invention in an unfolded position.

FIG. 11 is a plan view illustrating another exemplary display device DD of the invention in an unfolded position. Hereinafter, detailed descriptions for the same component and/or configurations as the display device DD of FIGS. 1 to 10D are omitted to avoid redundancy.

The display device DD may include a chip on film (COF)-type gate driving circuit GDC as shown in the above-described data driving circuit DDC. The gate driving circuit GDC may be mounted on the flexible circuit board FPCB connected to the second non-display area NDA-O2.

As mentioned above, as a non-display area is bent, a display device having a reduced bezel area may be provided. As a corner of a display module is cut away, a non-display area may be bent more easily. Even if a non-display area is bent by two or more bending lines, a specific area of the display device may not be subject to or damaged by stress.

Connection signal lines for providing a signal to a driving circuit may be disposed to overlap the display area. The connection signal lines may be disposed on a different layer than a pixel driving circuit. Even if a corner area is cut away, control signals may be delivered to different non-display areas through connection signal lines.

A noise blocking layer or a noise blocking pattern may prevent signal interference between connection signal lines and a pixel driving circuit.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:
1. A display device comprising:
a display panel comprising:
a display element layer including display elements and
a circuit layer including a display area and a non-display area peripheral to the display area, the non-display area having a first bending line and a second bending line intersecting the first bending line; and
at least one electronic component connected to the display panel,
wherein the circuit layer comprises:
an insulation layer disposed in the display area and the non-display area;
pixel circuits disposed in the display area and electrically connected to the display elements;
a driving circuit disposed in the non-display area and electrically connected to the pixel circuits; and
a connection signal line disposed in the display area, disposed on a different layer from the pixel circuits, and configured to electrically connect the at least one electronic component and the driving circuit,
wherein an intersection point of the first bending line and the second bending line is located at the outside of the non-display area or located at an edge of the non-display area.

2. The display device of claim 1, wherein the non-display area comprises:
a first non-display area disposed at the outside of the first bending line and the inside of the second bending line and bendable about the first bending line; and
a second non-display area disposed at the outside of the second bending line and the inside of the first bending line and bendable about the second bending line,
wherein the intersection point of the first bending line and the second bending line is located at an edge of the first non-display area or an edge of the second non-display area.

3. The display device of claim 2, wherein the pixel circuit comprises a first thin film transistor disposed on a base layer,
the connection signal line is disposed between the base layer and the first thin film transistor of the pixel circuit, and
the insulation layer comprises a first insulation layer disposed between the connection signal line and the first thin film transistor.

4. The display device of claim 3, wherein the driving circuit comprises a second thin film transistor disposed on the same layer structure as the first thin film transistor.

5. The display device of claim 3, wherein the circuit layer further comprises a noise shielding element disposed between the first insulation layer and the first thin film transistor and overlapping the connection signal line, and
the insulation layer further comprises a second insulation layer disposed between the noise shielding element and the first thin film transistor.

6. The display device of claim 1, wherein the non-display area comprises:
a first non-display area disposed at the outside of the first bending line and the inside of the second bending line and bendable about the first bending line; and
a second non-display area disposed at the outside of the second bending line and the inside of the first bending line and bendable about the second bending line,
wherein an edge of the first non-display area and an edge of the second non-display area connected to the edge of the first non-display area define a cut area of the non-display area; and the intersection point of the first bending line and the second bending line is located in the cut area or located at the edge of the first non-display area or the edge of the second non-display area.

7. The display device of claim 1, wherein the at least one electronic component includes a flexible circuit board electrically connected to the connection signal line.

8. The display device of claim 7, wherein the circuit layer further comprises signal lines including intersecting and insulated gate lines and data lines; and the data lines are connected to the flexible circuit board and the gate lines are connected to the driving circuit.

9. The display device of claim 1, wherein the connection signal line comprises a clock signal line.

10. The display device of claim 1, wherein the display elements comprise an organic light emitting diode.

11. A display device comprising:
a display panel comprising:
  a display element layer and
  a circuit layer including a display area, a first non-display area defined at the outside of a first bending line and the inside of a second bending line intersecting the first bending line and bendable about the first bending line, and a second non-display area defined at the outside of the second bending line and the inside of the first bending line and bendable about the second bending line; and
an electronic component connected to the first non-display area,
wherein the circuit layer comprises:
an insulation layer disposed in the display area and the non-display area;
a pixel circuit disposed in the display area and electrically connected to the display element layer; and
a connection signal line overlapping the display area, the first non-display area, and the second non-display area, and disposed on a different layer than the pixel circuit.

12. The display device of claim 11, further comprising a driving circuit disposed in the second non-display area, wherein the connection signal line electrically connects the electronic component and the driving circuit.

13. The display device of claim 12, wherein the driving circuit is disposed on the same layer as the pixel circuit.

14. The display device of claim 12, wherein an intersection point of the first bending line and the second bending line is located at the outside of the first non-display area and the second non-display area, or located at an edge of the first non-display area or an edge of the second non-display area.

15. The display device of claim 12, wherein the pixel circuit comprises a first thin film transistor disposed on a base layer,
at least a portion of the connection signal line is disposed between the base layer and the first thin film transistor, and
the insulation layer comprises a first insulation layer disposed between the connection signal line and the first thin film transistor.

16. The display device of claim 15, wherein the connection signal line comprises:
a first portion disposed between the base layer and the pixel circuit thin film transistor;
a second portion disposed on the same layer as an electrode of the pixel circuit thin film transistor and configured to connect the electronic component and the first portion; and
a third portion disposed on the same layer as the electrode of the pixel circuit thin film transistor and configured to connect the driving circuit and the first portion.

17. The display device of claim 15, wherein the circuit layer further comprises a noise shielding element disposed between the first insulation layer and the first thin film transistor and overlapping the connection signal line, and
the insulation layer further comprises a second insulation layer is disposed between the noise shielding element and the first thin film transistor.

18. The display device of claim 11, wherein the electronic component comprises a flexible circuit board electrically connected to the connection signal line.

19. The display device of claim 11, wherein the connection signal line comprises a plurality of lines and at least one of the plurality of connection signal lines receives an AC signal.

20. A display device comprising:
a display panel comprising a display area and a non-display area peripheral to the display area, the non-display area having a first bending line and a second bending line intersecting the first bending line; and
a flexible circuit board connected to the display panel,
wherein the display panel comprises:
an organic light emitting diode disposed in the display area;
a first thin film transistor disposed in the display area and connected to the organic light emitting diode;
a gate driving circuit disposed in the non-display area;
a connection signal line disposed in the display area on a different layer from the first thin film transistor, and configured to electrically connect the flexible circuit board and the gate driving circuit,
wherein an intersection point of the first bending line and the second bending line is located at the outside of the non-display area or located at an edge of the non-display area.

* * * * *